United States Patent [19]

Kuwana et al.

[11] Patent Number: 5,280,432
[45] Date of Patent: Jan. 18, 1994

[54] ANTI-SKID BRAKE CONTROL SYSTEM BASED ON ACCELERATION DETECTION

[75] Inventors: Kazutaka Kuwana; Kuniaki Okamoto; Tsuyoshi Yoshida; Hiroyuki Ichikawa; Masaru Kamikado; Nobuyasu Nakanishi, all of Aichi; Tatsuo Sugitani, Shizuoka; Kazunori Sakai, Aichi, all of Japan

[73] Assignee: Aisin Seiki Kabushiki Kaisha, Kariya, Japan

[21] Appl. No.: 562,991

[22] Filed: Aug. 6, 1990

[30] Foreign Application Priority Data

Aug. 5, 1989 [JP] Japan .................................. 1-203639

[51] Int. Cl.$^5$ ........................... B60T 8/32; B60T 8/60
[52] U.S. Cl. ............................. 364/426.02; 180/197; 303/93; 303/95; 303/100
[58] Field of Search ............... 364/426.02, 426.01, 364/426.03; 303/95, 97, 100, 103, 91, 93, 94, 99, 109; 180/197

[56] References Cited

U.S. PATENT DOCUMENTS

| | | | |
|---|---|---|---|
| 4,439,832 | 3/1984 | Sato et al. | 303/97 X |
| 4,741,580 | 5/1988 | Matsubara et al. | 364/426.02 X |
| 4,841,446 | 6/1989 | Leiber et al. | 364/426.02 |
| 4,900,100 | 2/1990 | Higashimata et al. | 303/100 |
| 4,962,455 | 10/1990 | Ishikawa et al. | 364/426.02 |

Primary Examiner—Parshotam S. Lall
Assistant Examiner—Collin W. Park
Attorney, Agent, or Firm—Sughrue, Mion, Zinn Macpeak & Seas

[57] ABSTRACT

The anti-skid control system is constructed with a brake fluid pressure source for generating brake fluid pressure at high and low levers, a switching valve feeding either high pressure or low pressure to the wheel cylinders, a wheel velocity detecting device sensing the driving wheel rotating speed, an acceleration detecting device detecting the vehicle acceleration and a first arithmetic operation device for finding the estimated vehicle speed and the wheel rotating acceleration based on the wheel velocity detected by the wheel velocity detecting device and the vehicle body acceleration detected by the acceleration detecting device. A brake fluid pressure controlling device is provided for increasing, decreasing or maintaining the brake fluid pressure in the wheel cylinders, controlling the switching valve on the basis of wheel velocity, estimated vehicle speed, and wheel rotating acceleration. A second arithmetic operation device marks the minimum and maximum values in the wheel velocity after a brake fluid pressure reduction based on the wheel velocity detected by the wheel velocity detecting device calculates the recovery acceleration in the wheel velocity in the shift from the minimum value to the maximum value and compares the recovery acceleration with the set value. A vehicle acceleration correcting device corrects the vehicle body acceleration detected by the acceleration detecting device so as to set the vehicle body acceleration at a smaller value in case the recovery acceleration is less than the set value.

3 Claims, 9 Drawing Sheets

FIG. 3
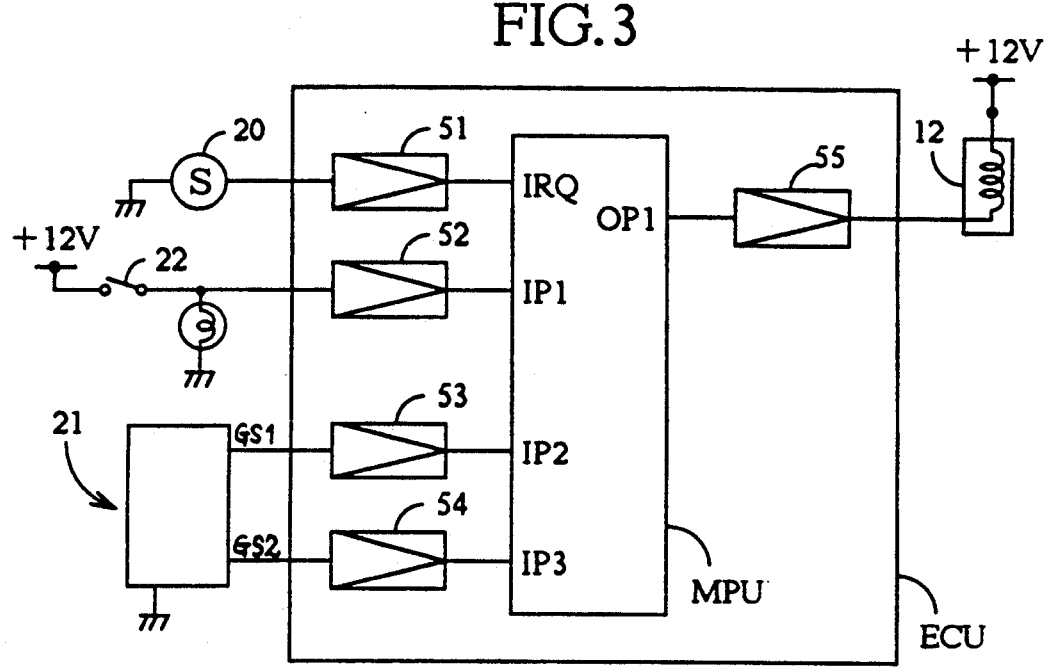
FIG. 4
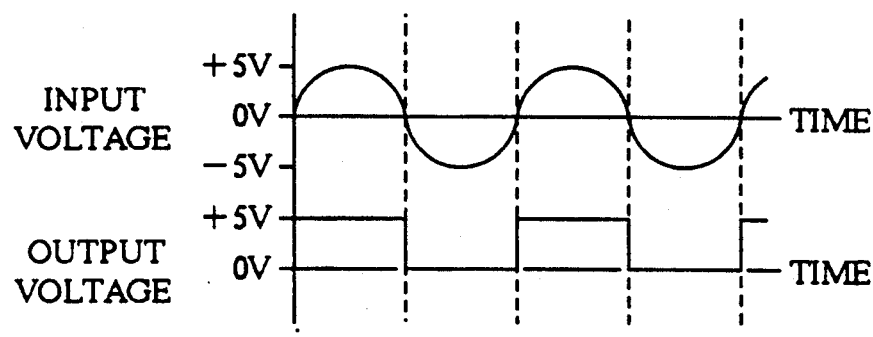
FIG. 6
| IP2 | L | L | H |
| --- | --- | --- | --- |
| IP3 | L | H | H |
| ROAD SURFACE CLASSIFICATION | LOW-$\mu$ | MEDIUM-$\mu$ | HIGH-$\mu$ |

| ROAD SURFACE CLASSIFICATION | POWER TRAIN ON MARKING FLAG NOT SET | POWER TRAIN ON MARKING FLAG SET |
|---|---|---|
| LOW $\mu$ | 0.3G | 0.2G |
| MEDIUM $\mu$ | 0.5G | 0.4G |
| HIGH $\mu$ | 1.1G | 0.9G |

ANTI-SKID BRAKE CONTROL SYSTEM BASED ON ACCELERATION DETECTION

FIELD OF THE INVENTION

The present invention relates to an anti-skid control system which prevents the wheels from locking by controlling the braking force exerted onto the wheels at the time when the brake is applied to the wheels of a motor vehicle.

BACKGROUND OF THE INVENTION

Prior Art

It has been widely known that the driving stability of a motor vehicle is lost or its steering performance is impaired in some cases, depending on the conditions of the road surface, if the wheels are locked when sharp braking is applied to the motor vehicle. Therefore, it has been in practice to employ an anti-skid control system to control the braking force by decreasing, increasing, or maintaining the pressure of the brake fluid working on the wheel cylinders lest the wheels should be locked at the time of sharp braking, and such a system is also called "anti-lock system". The anti-skid control system as applied to the wheels of a motor vehicle takes the form of such control over the rear wheels or that of such control over the front wheels and the rear wheels, namely, the four wheels. The former prevents the rear wheels from locking and can reduce the braking distance of the motor vehicle. The latter can additionally prevent the front wheels from locking and can therefore maintain the steering performance in a good condition.

In the anti-skid control system, it is designed to control the braking force in such a manner as eventually to maintain the slip factor of the wheels at approximately 20 per cent, namely, to secure the maximum coefficient of friction, by controlling the pressure of the brake fluid in accordance with the rotating acceleration (including deceleration here as in the subsequent part of this Specification) of the wheels in view of the fact that the wheel velocity declines abruptly immediately before the coefficient of friction $\mu$ attains the maximum value in relation to the wheels as the pressure of the brake fluid applied to the wheel cylinders is increased. With respect to such control performed on the braking force applied to the individual wheels, it is found necessary to perform adequate control over the braking force in accordance with the state of recovery of the wheel velocity on the driving wheels because the driving wheels will be liable to the occurrence of their locking at an early stage if the same control of the braking force as at the time when the power train is disconnected is performed at the time when the power train is connected, for the moment of inertia working on the driving wheels is considerably different between the time when the power train forms a connection between the engine and the driving wheels and the time when the power train does not form any such connection (the difference being related to the presence or absence of the "engine brake" effect), particularly in respect of such control applied to the driving wheels.

As an example of the existing anti-skid control system which performs its control of the braking force in accordance with the state of recovery of the wheel velocity, the system disclosed in the Official Gazette for Patent Laid Open No. 32290-1978 may be cited. Specifically, this cited system is designed to set up a simulated acceleration signal, which is set in advance on the basis of the minimum value of the wheel velocity in the process of the recovery of the wheel velocity on the driving wheels after a pressure reduction of the brake fluid pressure, to prevent an extension of the braking distance by effecting a sharp increase of the brake fluid pressure in case the recovery of the actual wheel velocity is in excess of the velocity indicated by the simulated acceleration signal, assuming in such a case that the power train is disconnected, and to prevent the occurrence of an early-stage lock of the driving wheels by controlling the pressure of the brake fluid for its moderate increase, assuming that the power train is connected.

Problems to be Overcome by the Invention

Now that the wheel velocity declines gradually in such a manner as to amount to a considerable decline in relation to the actual vehicle speed as the number of times of the controlling cycles increases in the course of the anti-skid control performed while the power train is connected to the wheels, it is important, for the purpose of preventing the occurrence of an early-stage lock on the driving wheels, that the wheel velocity is recovered sufficiently. However, the existing system cited above is designed to output as a simulated deceleration signal the estimated vehicle speed in the value found on the assumption that the wheel velocity at the time of braking, which is taken as the standard, is decreased at the prescribed rate of deceleration and to output a braking force reducing signal in case the wheel velocity signal becomes smaller than the said simulated deceleration signal, but the cited system does not output this simulated deceleration signal in accordance with the connection or disconnection of the power train. Thus, the cited system presents the problem that the recovering acceleration in the actual wheel velocity falls below the simulated acceleration signal and that the wheel velocity declines considerably in relation to the actual vehicle speed along with an increase of the controlling cycle, since the wheel velocity is not recovered sufficiently even if the pressure increase is moderate, with the result that an early-stage lock occurs to the wheels, depriving the motor vehicle of its running stability. Moreover, the existing system cited above is designed to shorten the braking distance by effecting a sharp increase in the pressure of the brake fluid in case the recovery of the actual vehicle speed in excess of the simulated acceleration signal, assuming in such a case that the power train is disconnected, but this process will possibly cause a sharp increase in the pressure of the brake fluid, even when the power train is connected to the wheels, as the wheel velocity temporarily exceeds the value of the simulated acceleration signal in consequence of the fluctuations in the wheel velocity signal when the motor vehicle is running on a rough road surface. Then, as the result of such a sharp increase in the brake fluid pressure, the vehicle speed declines considerably in relation to the actual vehicle speed, causing an early-stage lock to occur.

SUMMARY OF THE INVENTION

Objects of the Invention

In view of the problems found in the existing system cited above, the present invention takes it up as its technical object to offer a control system which performs the anti-skid control on the driving wheels, whereby the early-stage locking of the wheels is prevented with certainty at the time when the power train is connected, so that the running stability of the motor vehicle is thereby improved.

Means of Accomplishing the Objects

The measures taken in order to accomplish the technical object described above have produced an anti-skid control system which performs the control of the brake fluid pressure working on the driving wheels on the basis of the rotating velocity of the driving wheels as detected by a wheel velocity detecting means provided at the side of the driving wheels, wherein the said anti-skid control system is realized in a construction provided with a brake fluid pressure source, which generates a high pressure and a low pressure, a switching valve means, which is installed between the wheel cylinders of the driving wheels driven via a speed change gear by the power source and the said brake fluid pressure source and selectively feeds either one of the said high pressure and the said low pressure, a wheel velocity detecting means, which detects the rotating velocity of the driving wheels, an acceleration detecting means, which detects the acceleration of the vehicle body, a first arithmetic operation means, which works out the estimated vehicle speed and the acceleration in the wheel rotation on the basis of the wheel velocity detected by the said wheel velocity detecting means and the acceleration detected by the said acceleration detecting means, a brake fluid pressure controlling means, which effects an increase or a decrease of the brake fluid pressure in the said wheel cylinders by controlling the said switching valve means on the basis of the said wheel velocity, the said estimated vehicle speed, and the said acceleration in the wheel rotation, a second arithmetic operation means, which works out the minimum value and the maximum value of the said wheel velocity to work after the decrease in the pressure of the brake fluid on the basis of the wheel velocity detected by the said wheel velocity detecting means and finds the said recovery acceleration in the shift from the minimum value to the maximum value mentioned above, thereby comparing the said recovery acceleration with the set value, and a vehicle acceleration correcting means, which corrects the acceleration detected of the vehicle body by the said acceleration detecting means, setting the said acceleration at a smaller value in case the said recovery acceleration is less than the set value.

Effect

With the system mentioned above, the pressure of the brake fluid applied to the wheel cylinders of the driving wheels is increased or decreased by the switching valve means. That is to say, when the switching valve means maintains an interconnection between the wheel cylinders of the driving wheels and the high pressure at the brake fluid pressure source, the pressure in the brake fluid in the wheel cylinders for the driving wheels is increased. On the contrary, when the switching valve means maintains an interconnection between the wheel cylinders for the driving wheels and the low pressure in the brake fluid pressure source, the pressure in the brake fluid in the wheel cylinders for the driving wheels is decreased. Furthermore, by the repeated switching of the switching valve means at a high speed, this system is capable of setting the brake fluid pressure applied to the wheel cylinders of the driving wheels at a pressure intermediate between the low pressure and the high pressure set in the brake fluid pressure source. Therefore, this system can perform the increase, decrease, and maintenance of the brake fluid pressure in the wheel cylinders for the driving wheels by the action of the switching valve means.

Moreover, the first arithmetic operation means is fed with the input of the wheel velocity detected of the driving wheels by the wheel velocity detecting means and the acceleration detected of the vehicle body by the acceleration detecting means. The first arithmetic operation means finds the estimated vehicle speed to decelerate at the prescribed rate of acceleration and the acceleration in the rotation of the driving wheels by arithmetic operations which the said means perform on the basis of the wheel velocity of the driving wheels and the acceleration of the vehicle body as input into the said means. The wheel velocity of the driving wheels, the estimated vehicle speed and the acceleration in the rotation of the driving wheels are input into the brake fluid pressure controlling means. Then, brake fluid pressure controlling means controls the switching valve means on the basis of the wheel velocity of the driving wheels, the estimated vehicle speed, and the acceleration in the rotation of the driving wheels which have been input into it, thereby feeding appropriate brake fluid pressure to the wheel cylinders for the driving wheels. Therefore, with the means mentioned above, the system is capable of preventing the driving wheels from locking.

Moreover, the second arithmetic operation means receives the input of the wheel velocity of the driving wheels as detected by the wheel velocity detecting means. The second arithmetic operation means finds the minimum value and the maximum value for the wheel velocity to work after the decrease of the brake fluid pressure, works out by arithmetic operations the recovery acceleration for the shift of the wheel velocity from the minimum value to the maximum value, and compares the said recovery acceleration with the set value. Then, when the recovery acceleration is any smaller than the set value, the second arithmetic operation means judges that the power train between the power source and the driving wheels is in the state of connection. The result of the judgment made by the second arithmetic operation means is input into the vehicle acceleration correcting means. Then, the vehicle acceleration correcting means corrects the vehicle acceleration detected by the acceleration detecting means by setting the acceleration at a smaller value in case the recovery acceleration is smaller than the set value. Therefore, in case the power train between the power source and the driving wheels is in the state of connection, this system corrects the acceleration in the estimated vehicle speed as calculated on the basis of the wheel velocity of the driving wheels and the acceleration of the vehicle body by setting the acceleration at a smaller value, thereby promoting the recovery of the wheel velocity to a sufficient extent. Therefore, this system is capable of preventing the wheels from locking at an early stage while the power train is connected to the wheels and thereby improving the running stability of the motor vehicle.

BRIEF DESCRIPTION OF THE DRAWINGS

The manner by which the above objects, features and advantages of the present, invention are attained will be fully evident from the following detailed description when it is considered in light of the attached drawings, wherein:

FIG. 3 is a block diagram illustrating the electronic control system in one example of preferred embodiments of the present invention;

FIG. 4 is a graph showing the characteristics of the waveform rectifying circuit in one example of preferred embodiments of the present invention;

FIG. 6 is a chart showing the characteristics indicating the criteria for the classification of road surfaces in one example of preferred embodiments of the present invention;

Figure 1:
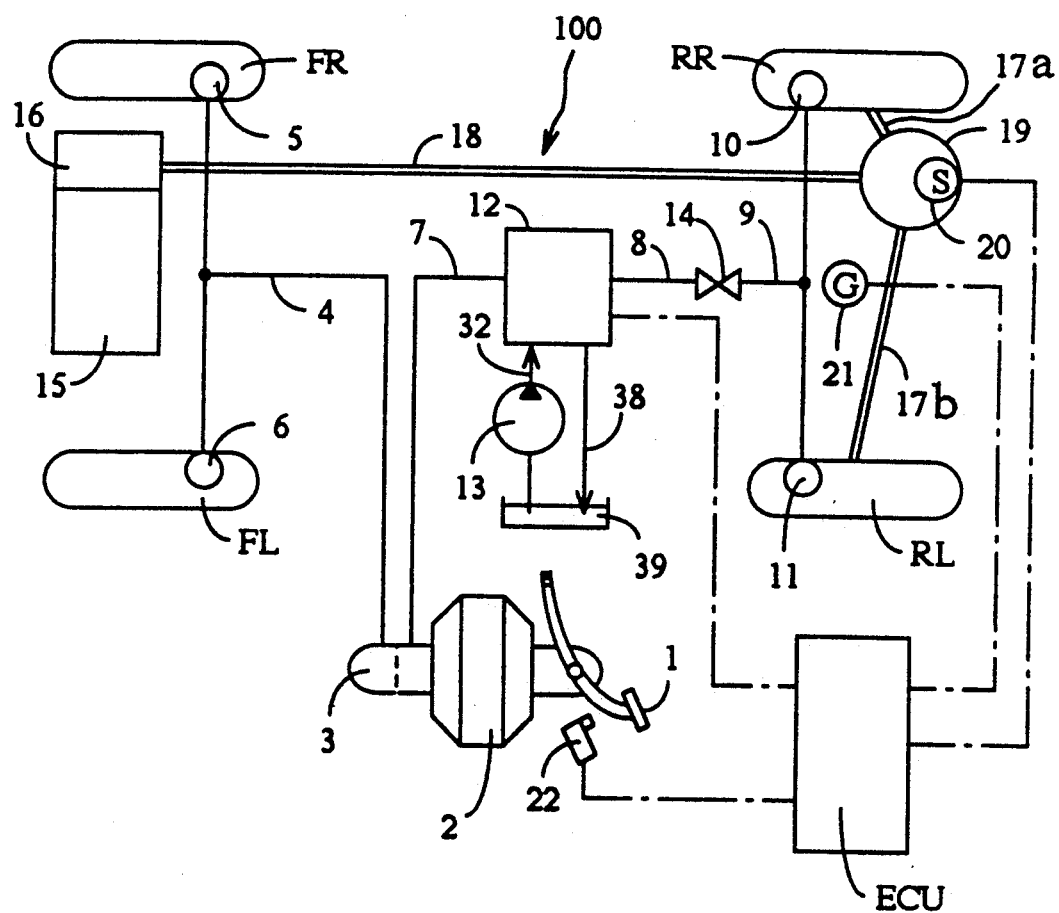
FIG. 1 is a block diagram illustrating the outline of one example of preferred embodiments of the anti-skid control system according to the present invention.

In the Figures mentioned hereinabove, the following reference numbers represent the following items:

1 ... Brake pedal
3 ... Master cylinder
4 ... Fluid pressure piping
5 and 6 ... Wheel cylinders
7, 8, and 9 ... Fluid pressure piping
10 and 11 ... Wheel cylinders
12 ... Actuator (Switching valve means)
13 ... Fluid pressure pump (brake fluid pressure source)
15 ... Engine
16 ... Speed change gear
18 ... Propeller shaft
19 ... Differential gear
20 ... Wheel velocity sensor (Wheel velocity detecting means)
21 ... Acceleration detecting means
22 ... Brake indicating lamp switch
30 ... Fluid pressure feeding and discharging piping
31 ... Regulator valve
32 ... Fluid pressure piping
34 ... Fluid pressure piping
35 ... Electromagnetic switching valve (Switching valve means)
36 ... Solenoid
37 ... Fluid chamber
38 ... Fluid pressure piping
39 ... Reserver (Brake fluid pressure source)
43 ... Cut-off valve
45 ... Pressure reducing piston
51 ... Waveform rectifying circuit
52, 53, and 54 ... Input buffers
55 ... Output buffers
ECU ... Electronic Control Unit (the first arithmetic operation means, the brake fluid pressure controlling means, the second arithmetic operation means, and the vehicle acceleration correcting means)

DETAILED DESCRIPTION OF THE INVENTION

Reference will now be made in detail to the construction of the anti-skid control system according to the present invention as illustrated in the accompanying drawings, in which like reference numbers designate like or corresponding parts throughout the several drawings.

In the description to follow, some embodiments of the present invention will be used as examples. It should be understood, however, that the present invention is not limited to these examples of its embodiment, but may be applied effectively to other forms of its embodiment to such an extent as will not deviate from the technical scope defined for the present invention.

Now, FIG. 1 is a block diagram illustrating the outline of the anti-skid control system 100 in this embodiment of the present invention. The anti-skid control system 100 in this example of preferred embodiment controls only the pressure of the brake fluid in each of the wheel cylinders 10 and 11 for the rear wheels RR and RL, which are the driving wheels for a motor vehicle with the engine mounted in its front and with the driving mechanism formed with the rear wheels, and this system does not directly control the brake fluid pressure in the wheel cylinders 5 and 6 for the individual front wheels FR and FL, which are the driven wheels, since these wheel cylinders 5 and 6 for the front wheels are directly connected with the master cylinders 3. A system like this is suitable for those motor vehicles which undergo considerable changes in the load borne by the rear wheels RR and RL, for example, small-size tracks and minibuses.

The master cylinder 3, which is operated with operator's treading force as applied to the brake pedal 1 and boosted by the negative pressure type boosting device 2, generates the braking force proportionate to the boosted treading force. In this example of preferred embodiment, the master cylinder used is one of the tandem type, and one of its systems is connected to the wheel cylinders 5 and 6 by way of the fluid pressure piping 4, so that the front right wheel FR and the front left wheel FL are respectively set in the braked state when the brake fluid pressure in the master cylinder 3 is exerted onto the wheel cylinders 5 and 6. Moreover, the other system of the master cylinder 3 is connected to the wheel cylinders 10 and 11 by way of the fluid pressure pipings 7, 8, and 9, so that the rear right wheel RR and the rear left wheel RL are put into the braked state when the brake fluid pressure in the master cylinder 3 is exerted onto the wheel cylinders 10 and 11.

An actuator 12 is installed between the fluid pressure piping 7 and the fluid pressure piping 8. The actuator 12, which is operated with the fluid pressure generated by the fluid pressure pump 13 driven by the engine 15, regulates the braking pressure exerted onto the wheel cylinders 10 and 11 in accordance with the instructions given by the Electronic Control Unit (ECU). Also, in this example of preferred embodiment, a fluid pressure regulating valve of the load sensing type (LSPV) 14 is set between the fluid pressure piping 8 and the fluid pressure piping 9, so that the said fluid pressure regulating valve suppresses the rising gradient of pressure in the wheel cylinders 10 and 11 to a value smaller than that of the rising gradient of the brake fluid pressure in the master cylinder 3 in accordance with the load carried by the motor vehicle.

To the engine 15, a speed change gear 16 is connected to change the speed reduction ratio between the engine 15 and the propeller shaft 18 in order to achieve the required driving force. The revolutions output from the speed change gear is transmitted to the differential gear 19 via the propeller shaft 18. The differential gear 19 further reduces the revolutions of the propeller shaft 18 and transmits the revolutions to the rear wheels RR and RL by way of the wheel axles 17a and 17b. A vehicle speed sensor 20 is set in the differential gear 19. The vehicle speed sensor 20 detects the rotating velocity of the propeller shaft 18, namely, the average wheel velocity of the rear right wheel RR and the rear left wheel RL.

Also, for detecting the acceleration of the vehicle, an acceleration sensor 21 is fixed in an appropriate position on the motor vehicle. This acceleration sensor 21 is a generally known type, i.e. the mercury switch type or a pendulum type, and this sensor is fixed in a position to which the vibrations from the road surface and the vibrations of the engine 15 are hardly transmitted. Moreover, in order to detect the operation of the brake by the operator's stepping on the brake pedal 1, a brake indicating lamp switch 22 is set in the proximity of the brake pedal. In this regard, the brake indicating lamp switch 22 is turned ON when the brake pedal 1 is operated.

The electronic control unit (ECU) 10 is fed with the input of electrical signals from the wheel velocity sensor 20, the acceleration sensor 21, and the brake indicating lamp switch 22. Also, the electronic control unit (ECU) outputs the electrical signals for controlling the actuator 12.

Figure 2:
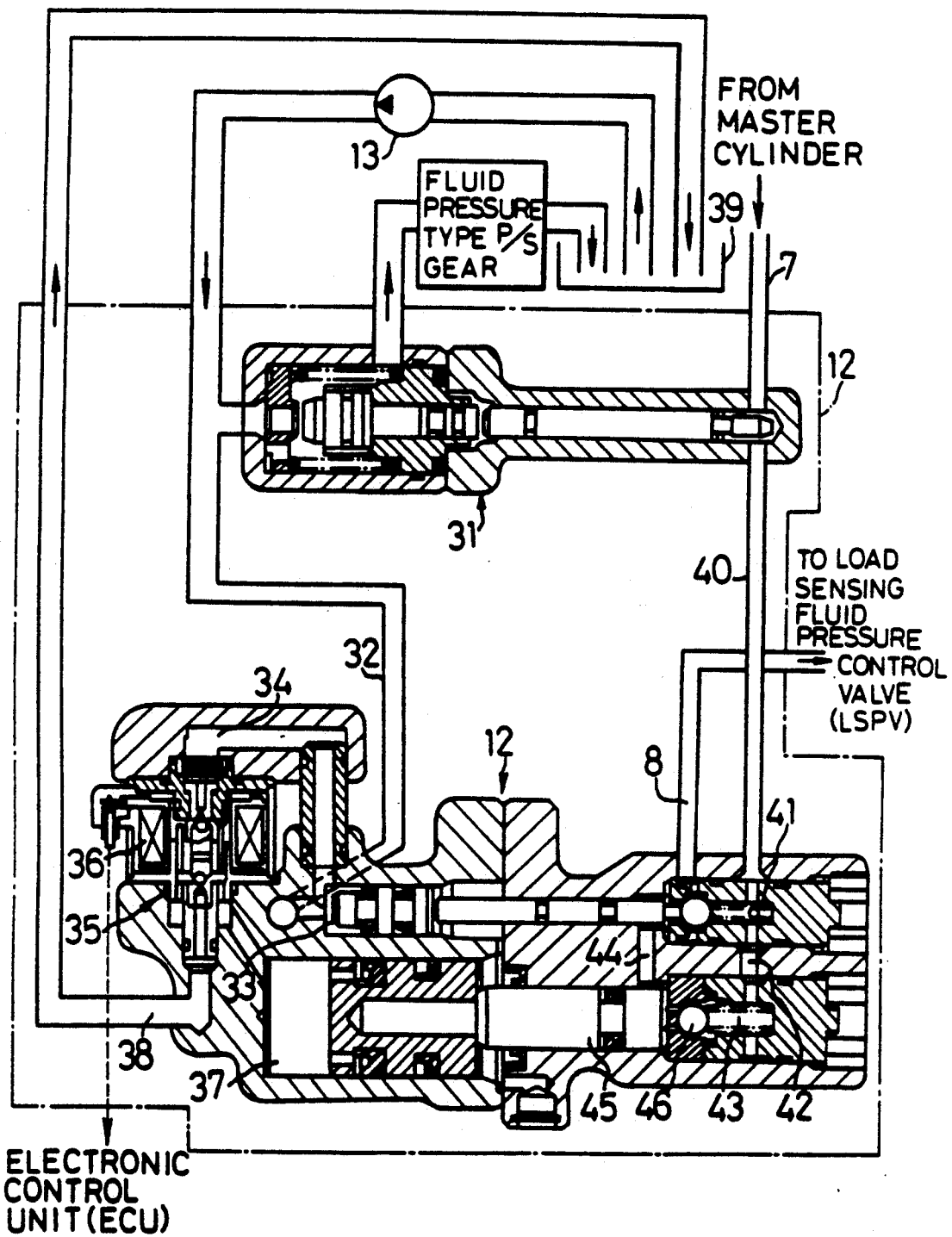
FIG. 2 is a sectional view illustrating the actuator in one example of preferred embodiments of the anti-skid control system according to the present invention.

Next, with reference to FIG. 2, a description is made of the actuator 12 employed in this example of preferred embodiment of the present invention. The actuator 12 is a generally known variable displacement type actuator provided with a fluid feeding and discharging valve 30 and a regulator valve 31, and this regulator valve 31 adjusts the fluid pressure generated by the oil pump 13 in such a manner that the said fluid pressure always maintains a constant ratio to the brake fluid pressure generated by the master cylinder 3. The fluid pressure so regulated by the regulator valve 31 is fed into the fluid pressure piping 34 through the fluid pressure piping 32 and the fluid chamber 33. The fluid pressure thus fed into the fluid pressure piping is led into the fluid chamber 37 by the passage 34. At this time, the brake fluid pressure generated by the master cylinder 3 is led into the wheel cylinders 10 and 11 via the channels provided with the fluid pressure piping 7, the fluid pressure piping 40, the bypass valve 41, the fluid pressure piping 42, the cut-off valve 43, the fluid pressure piping 44, and the fluid pressure piping 8 in the stated order of arrangement.

The electromagnetic switching valve 35 forms an inter-connection between the fluid pressure piping 34 and the fluid chamber 37 when no electric power is conductive in the solenoid 36 while the said valve 35 establishes an inter-connection between the fluid pressure piping 38, which leads into the reserver 39, and the fluid chamber 37 when electric power is conductive in the solenoid 35. When electric power is conductive in the solenoid 35 in the electromagnetic switching valve 34, the fluid under pressure in the fluid chamber 37 is discharged into the reserver 39 through the fluid pressure piping 38, at which time the pressure reducing piston 45 moves towards the left side as shown in FIG. 2, so that the capacity of the fluid chamber 37 is thereby reduced. When the pressure reducing piston 45 thus moves leftward as shown in the Figure, the inter-connection between the cut-off valve 43 and the fluid pressure piping 44 is cut off by the ball 46. When the fluid pressure in the fluid chamber 37 is further reduced, the movement of the pressure reducing piston 45 causes an increase in the capacity of the said fluid chamber 37 on the side of the wheel cylinders 10 and 11, so that the brake fluid pressure applied to the wheel cylinders 10 and 11 are thereby reduced.

When the solenoid 35 is cut off from the supply of electric power while it is in this state, an inter-connection is formed by the electromagnetic switching valve between the fluid chamber 37 and the fluid pressure piping 34, and the fluid pressure in the fluid chamber 37 increases. By the effect of the increase of fluid pressure in the fluid chamber 37, the pressure reducing piston 45 moves towards the right side shown in the Figure, thereby reducing the capacity of the fluid chamber at the side of the wheel cylinders 10 and 11, so that the brake fluid pressure applied to the wheel cylinders 10 and 11 is increased.

As the result, the brake fluid pressure exerted onto the wheel cylinders 10 and 11 is reduced when electric power is conductive in the solenoid 35 of the electromagnetic switching valve 34. On the contrary, electric power is not conductive in the solenoid 35, the brake fluid pressure exerted onto the wheel cylinders 10 and 11 is increased.

Accordingly, the system in this example of preferred embodiment controls the brake fluid pressure applied to the wheel cylinders 10 and 11 in effect on the basis of the duty factor in the electrical signals fed to the solenoid 35 of the electromagnetic switching valve 34.

Next, with reference to FIG. 3, a description is made of the electronic control unit (ECU). The electronic control unit (ECU) is provided with a microprocessor unit (MPU), a waveform rectifying circuit 51, input buffers 52, 53, and 54, and an output buffer 55.

The microprocessor unit (MPU) used for this system is a single-chip microcomputer sold in large quantities on the market at present. The microprocessor unit (MPU) in this example of preferred embodiment integrates a free run timer, which outputs the current time, a ROM, which stores the programs, a RAM, which is necessary for the execution of the programs, a solenoid timer, which determines the time for feeding electric power to the solenoid 36, and so forth.

The characteristics of the waveform rectifying circuit are shown in FIG. 4. The sine waves which come transmitted from the wheel velocity sensor 20 are converted into square waves by this waveform rectifying circuit 51, and then the square wave signals are fed to the interrupt requiring terminal IRQ of the microprocessor unit (MPU). Therefore, interrupt demands are made of the microprocessor unit (MPU) at such intervals of time as are in accordance with the rotating velocity of the wheels as detected by the wheel velocity sensor 20.

The characteristics of the input buffer 52 are shown in Table 1. The on and off states of the brake indicating lamp switch 22 are input by the input buffer 52 into the input port IP1 of the microprocessor unit (MPU).

TABLE 1

| Switch Type | State | Buffer Output |
|---|---|---|
| Brake indicating lamp switch 22 | ON | H |
| | OFF | L |

Next, the characteristics of the input buffers 53 and 54 are presented in Table 2. The acceleration sensor 21 detects the acceleration of the motor vehicle in two bits, and the signals expressing the detected acceleration are input into the input ports IP2 and IP3 of the microprocessor unit (MPU) by the input buffers 53 and 54 via the individual terminals GS1 and GS2.

TABLE 2

| Acceleration | Terminal | Buffer Output |
|---|---|---|
| −0.4 G or less | GS 1 | H |
| | GS 2 | H |
| −0.2 g to −0.4 G | GS 1 | L |
| | GS 2 | H |
| −0.2 G to 0.2 G | GS 1 | L |
| | GS 2 | L |
| 0.2 G to 0.4 G | GS 1 | L |
| | GS 2 | H |
| 0.4 G or more | GS 1 | H |
| | GS 2 | H |

Moreover, the output buffer 55 is connected to the output port OP1 of the microprocessor unit (MPU). The output buffer 55 is the circuit which amplifies the electric power of the electrical signals output from the output port OP1 and excites the solenoid 36 of the actuator 12.

The electrical signals output from the output port OP1 are controlled by a program executed by the microprocessor (MPU). FIG. 5, FIG. 7, FIG. 8, FIG. 10, FIG. 11 and FIG. 12 are flow charts illustrating the outline of the programs which the microprocessor unit (MPU) executes. The programs executed by the microprocessor unit (MPU) consist of main routines and the interrupt routines which are executed when electrical signals are input to the interrupt requiring terminal IRQ.

Figure 5:
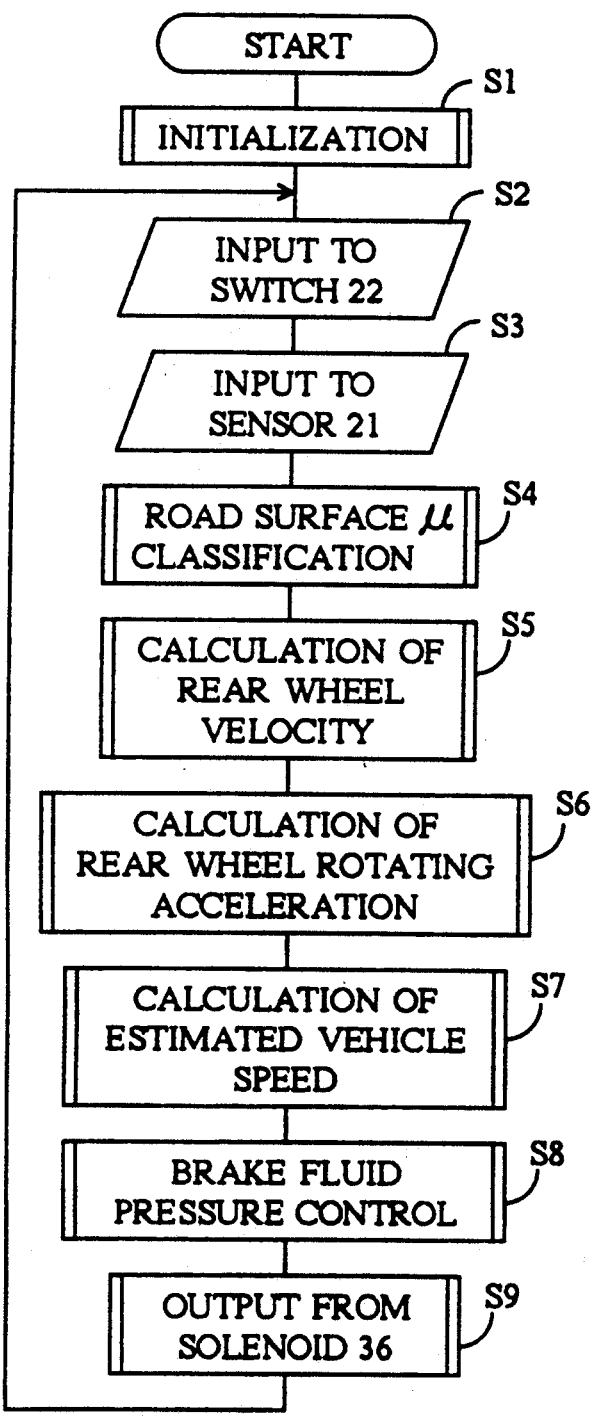
FIG. 5 is a flow chart showing the outline of the program executed by the microprocessor unit in one example of preferred embodiments of the present invention.

First, a description is made of the main routine shown in FIG. 5. When electric power is turned on to put the electronic control unit (ECU) into operation, the microprocessor unit (MPU) starts the processes as from the step S1.

At the step S1, the process of initialization is executed. When the step S1 is executed, the flags ta and tb, as well as the "control-in-process" flag, are cleared to zero. Also, the output port OP1 is set in such a way that electric power is not conductive in the solenoid 36.

At the step S2, the state of the brake indicating lamp switch 22 is input into the microprocessor unit (MPU).

At the step S3, moreover, the magnitude of acceleration detected by the acceleration sensor 21 is input into the microprocessor (MPU).

Next, at the step 4, the classification of the road surface (in terms of the coefficient of friction $\mu$) is performed on the basis of the table shown in FIG. 6 with respect to the output (in case any negative acceleration has been detected) from the input buffers 53 and 54 as input to the input ports IP2 and IP3 of the microprocessor (MPU) at the step S3.

Next, at the step S5, the system finds the average wheel velocity Vw by arithmetic operations on the basis of the period ΔTw of the electrical signal output from the wheel velocity sensor 20. The period ΔTw of the electrical signal output from the wheel velocity sensor 20 is measured by an interrupt routine (which will be described in detail later). The rotating velocity Vw is found by arithmetic operations with the equation (1).

$$\text{Wheel velocity } Vw = \frac{K}{\Delta Tw} \tag{1}$$

Wherein, K is a constant set on the basis of the characteristics of the wheel velocity sensor 20.

At the step S6, the wheel acceleration Gw of the rear wheels is calculated from the wheel velocity Vw as determined by arithmetic operations at the step S5. The acceleration Gw of the rear wheels is calculated with the equations (2) and (3) given in the following:

$$\text{Interrupt interval Int} = \tfrac{1}{2}(\Delta Tw_{(n)} + \Delta Tw_{(n-1)}) \tag{2}$$

$$\text{Acceleration in rotation } Gw_{(n)} = \frac{(Vw_{(n)} - Vw_{(n-1)})}{\text{Int}} \tag{3}$$

Wherein, $Vw_{(n)}$ and $\Delta Tw_{(n)}$ respectively represent the wheel velocity Vw and the period ΔTw which have been obtained by the arithmetic operations just described, and $Vw_{(n-1)}$ and $\Delta Tw_{(n-1)}$ respectively represent the wheel velocity Vw and the period ΔTw which were obtained earlier.

Figure 8:
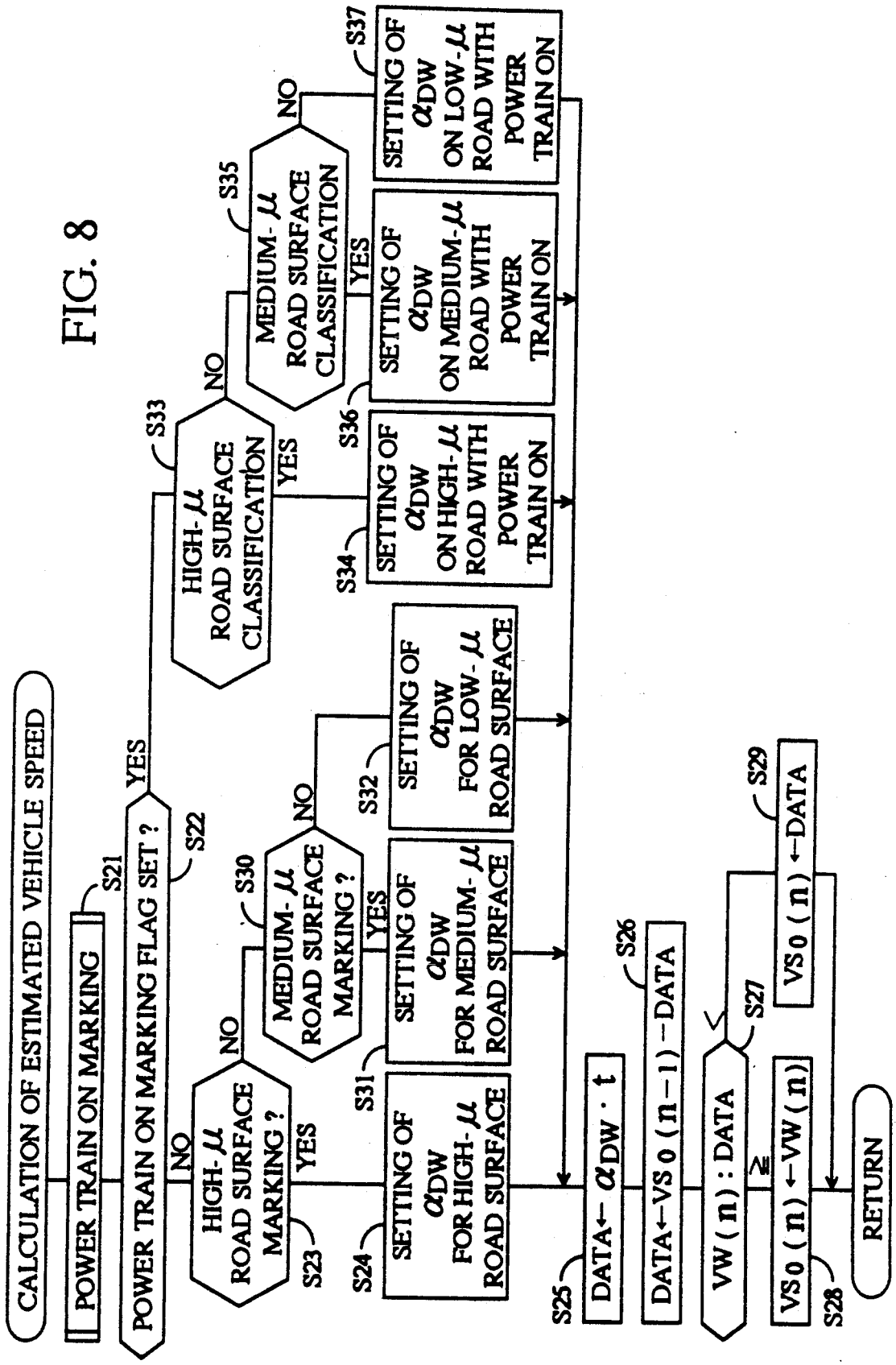
Figures 9, 10:
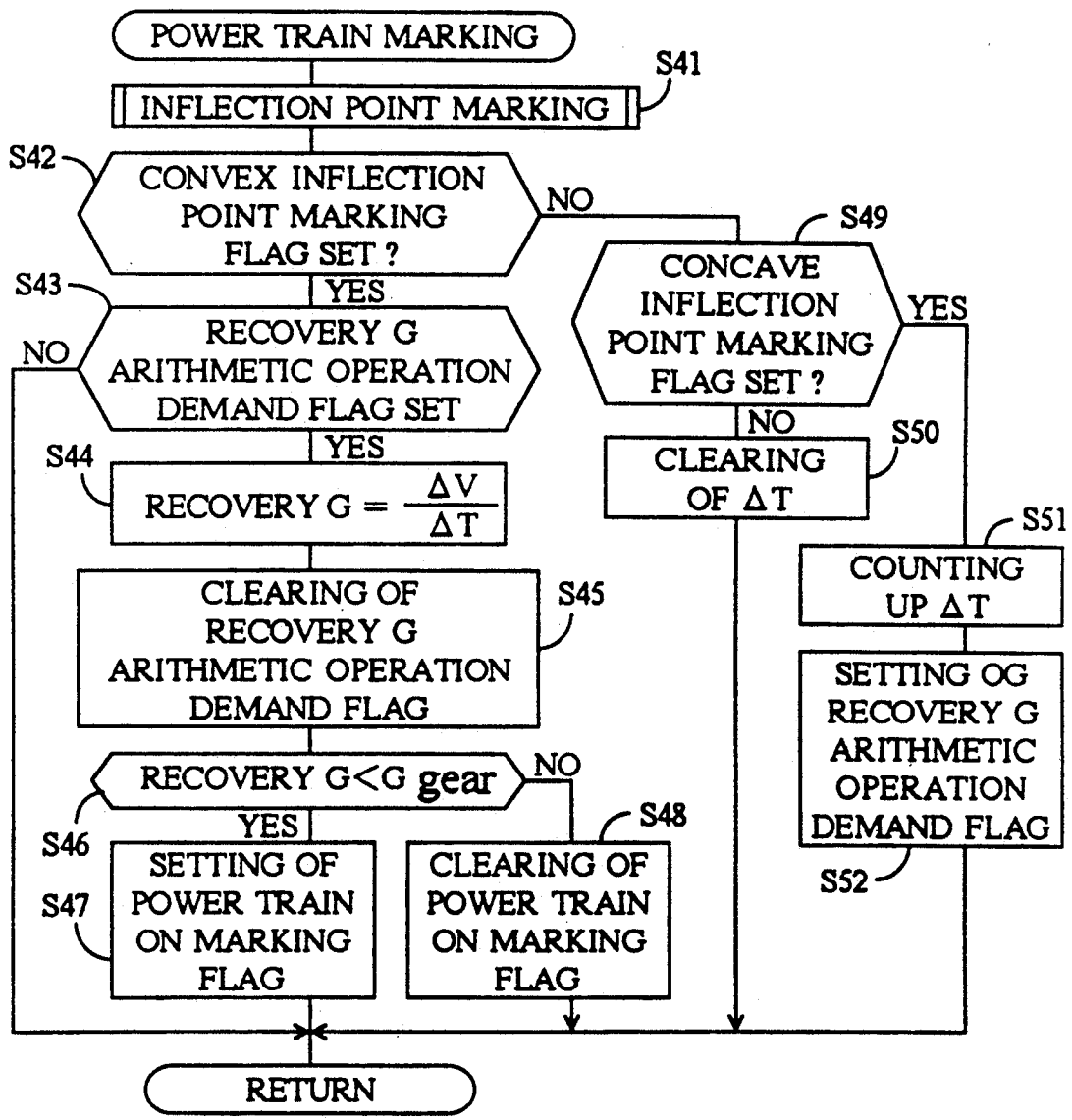
FIG. 9 is a chart presenting the characteristics for the values set for the estimated acceleration of the vehicle body by the acceleration detecting means in one example of preferred embodiments of the present invention.
FIG. 10, FIG. 11, and FIG. 12 are flow charts showing the outline of the programs executed by the microprocessor unit in one example of preferred embodiments of the present invention.

At the step S7, the estimated vehicle speed Vs0 is found by arithmetic operations from the estimated vehicle acceleration $\alpha_{DW}$, which is set up in advance at the step S4 and shown in FIG. 9, and the rotating velocity Vw of the rear wheels as calculated at the step S5. The estimated vehicle speed Vs0 is worked out by arithmetic operations with the equation (4). Moreover, the process at the step S7 will be described later with reference to FIG. 8, FIG. 10, and FIG. 11.

$$\text{Estimated vehicle speed } Vs_{0(n)} = Max\,(Vw_{(n)}, Vs_{0(n-1)} - \alpha_{DW} \cdot \text{Int}) \tag{4}$$

Wherein, Max (a, b) is a function which gives the larger value of a and b.

Moreover, $Vs_{0(n)}$ represents the estimated vehicle speed found this time, and $Vs_{0(n-1)}$ expresses the estimated vehicle speed Vs0 which was obtained at the previous time.

At the step S8, the system judges how to control the brake fluid pressure on the basis of the wheel velocity Vw, the wheel acceleration Gw of the rear wheels, the rotating acceleration Gw of the rear wheels, and the estimated vehicle speed Vs0, which are obtained at the steps, S5 through S7. Moreover, the process at the step S8 will be described later with reference to FIG. 12.

Then, at the step S9, the result of the judgment at the step 8 is output to the solenoid 36, and the brake fluid pressure applied to the wheel cylinders 10 and 11 is increased, decreased, or held at the same level (pressure hold).

The repeated execution of the processes at the steps S1 through S9 prevents the rear wheels RR and RL from locking by promoting the rotation of the rear wheels RR and RL through a reduction of the pressure of the brake fluid in case the average wheel velocity Vw of the rear wheels RR and RL declines sharply.

Figure 7:
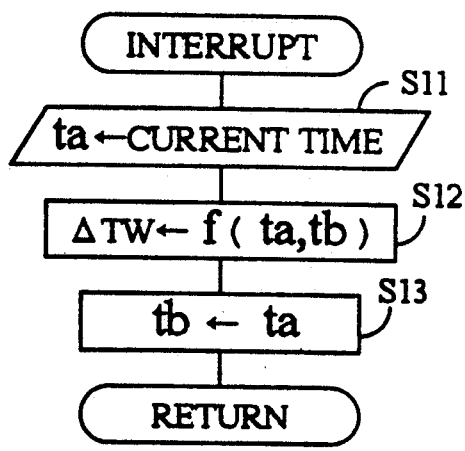
FIG. 7 and FIG. 8 are flow charts showing the outline of the programs executed by the microprocessor unit in one example of preferred embodiments of the present invention; is a flow chart showing the processing of the subroutine for the arithmetic operations for finding the estimated vehicle speed in the same preferred embodiment of the present invention.

Next, a description is made of the interrupt routine shown in FIG. 7. With the execution of this interrupt routine, measurement is made of the interval of time between the interrupt demand made at the previous time and the interrupt demand made at this time, namely, the period ΔTw of the electrical signal output from the wheel velocity sensor 20.

At the step S11, the current time ta is set up by the free run timer.

At the step S12, the difference of time between the time tb when the previous interrupt demand was made and the current time ta is found by arithmetic operations, and the period ΔTw of the electrical signal output from the wheel velocity sensor 20 is thereby set up.

At the step S13, the time tb is renewed and set up in preparation for the next interrupt demand.

After the processes at the step S11 through S13 are executed, the processing of the main routine shown in FIG. 5 is performed again.

Next, with reference to FIG. 8, a description is made of the subroutine for the calculation of the estimated vehicle speed. First, the power train ON marking subroutine shown in FIG. 10 is executed at the step S21. Then, at the step S22, it is judged whether or not the power train ON marking flag is set. When it is found that the power train ON marking flag is not set, the step S23 is executed, but, on the contrary, when the power train ON marking flag is set, the step S33 is executed. Moreover, the power train ON marking flag is set when the power train ON marking subroutine described later with reference to FIG. 10 has judged that the power train is ON, which in other words means that the power train between the rear wheels RR and RL and the engine 15 is in its connected state. At the step S23, the system judges whether or not the result of the road surface classification performed on the basis of the coefficient of friction $\mu$ at the step S4 is "high $\mu$". In case the result is "high $\mu$", the step S24 is executed, but, in case it is not "high $\mu$", the step S30 is executed.

At the step S24, the system sets the value of $a_{DW}$ on a high-$\mu$ road on the basis of the value of the estimated vehicle acceleration $a_{DW}$, which is set in advance without any power train ON marking flag in accordance with the result of the road surface classification in terms of the coefficient of friction $\mu$ as shown in FIG. 9.

Next, at the step S25, the product of the value $a_{DW}$ set up for the high-$\mu$ road at the step S24 and the value of Int is read as data into the system. At the step S26, the balance obtained by deducting the data read into the system at the step S25 from the estimated vehicle speed $V_{so(n-1)}$ calculated at the previous time is renewed as data.

At the step S27, the wheel velocity $Vw_{(n)}$ found at this time and the data as renewed at the step S26 are compared. In case the relationship $Vw_{(n)}$ DATA is found at the step S27, the system executes the step S28, at which the value $Vw_{(n)}$ is calculated as the estimated vehicle speed $V_{so(n)}$ at the current time. Moreover, in case the relationship $Vw_{(n)} < $ DATA is found at the step S27, the step S29 is executed, at which the DATA is calculated as the estimated vehicle speed $V_{so(n)}$ at the current time.

At the step S30, it is judged whether or not the result of the road surface classification performed at the step S4 is "medium $\mu$". In case it is found that the road surface has "medium $\mu$", the system executes the step S31, but, in case the road surface does not have "medium $\mu$", then the system executes the step S30.

At the step S31 and the step S32, the system sets the value of the $a_{DW}$ for the medium-$\mu$ and that of the $a_{DW}$ for the low-$\mu$, respectively, on the basis of the set value of the estimated vehicle acceleration $a_{DW}$ which is set in advance without the power train ON marking flag in accordance with the result of the road surface classification in terms of the coefficient of friction $\mu$ as shown in FIG. 9. Then, on the basis of the respective $a_{DW}$ values, the system finds the estimated vehicle value by the operations executed at the steps S25 through S29.

At the step S33, the system judges whether or not the result of the road surface classification performed at the step S4 indicates "high $\mu$" for the road. In case it is found that the road surface has a "high $\mu$", the system executes the step S34, but, in case the road surface does not have any "high $\mu$", the system executes the step S35.

At the step S34, the system sets the value of the $a_{DW}$ for the high-$\mu$ road on the basis of the set value of the estimated vehicle acceleration $a_{DW}$ which is set in advance, with the power train ON marking flag set ON, in accordance with the result of the road surface classification in terms of the coefficient of friction $\mu$ as shown in FIG. 9. Then, on the basis of the $a_{DW}$ value on the high-$\mu$, with the power train ON marking flag being set ON, the system finds the estimated vehicle speed by arithmetic operations performed at the steps S25 through S29.

At the step S35, the system judges whether or not the result of the road surface classification performed at the step S4 indicates "medium $\mu$" for the road. In case it is found that the road surface has a "medium $\mu$", the system executes the step S36, but, in case the road surface does not have any "medium $\mu$", the system executes the step S37.

At the step S36 and the step S37, the system sets the value of the $a_{DW}$ for the medium-$\mu$ road and that of the $a_{DW}$ for the low-$\mu$ road on the basis of the set value of the estimated vehicle acceleration $a_{DW}$ which is set in advance, with the power train ON marking flag set ON, in accordance with the result of the road surface classification in terms of the coefficient of friction $\mu$ as shown in FIG. 9. Then, on the basis of the respective $a_{DW}$ values, the system finds the estimated vehicle speed by arithmetic operations performed at the steps S25 through S29. Moreover, as illustrated in FIG 9, the system sets a more moderate (i.e. smaller) value for the estimated vehicle speed $a_{DW}$ when the power train ON marking flag is set up as compared with the time when the said flag is not set. The processing operations performed at the step S22 and at the steps S33 through S37 correspond to the processes executed by the vehicle acceleration correcting means according to the present invention.

Next, a description is made of the subroutine for marking the state of the power train ON, which is shown in FIG. 10.

First, the inflection point subroutine shown in FIG. 11 and described later is executed at the step S41, and, then at the step S42, the system judges whether or not the convex inflection point marking flag is set. In case the convex inflection point marking flag is set, the system executes the step S43, but, on the contrary, in case the convex inflection point marking flag is not set, the system executes the step S49. In this regard, the convex inflection point marking flag is set when it is judged by the inflection point marking subroutine shown in FIG. 11 and described later that the convex inflection point is attained, namely, that the wheel velocity is in the maximum value.

At the step S43, the system judges whether or not the recovery G arithmetic operation demand flag is set. In case the recovery G arithmetic operation demand flag is set, the system executes the step S44, but, in case the recovery G arithmetic operation demand flag is not set, then the system returns to the main routine.

At the step S44, the system calculates the recovery G. In this regard, the recovery G is worked out by arithmetic operations with the equation (5) given in the following:

$$\text{Recovery } G = \frac{\Delta V}{\Delta T} \quad (5)$$

Wherein, $\Delta V$ expresses the difference between the value $Vw_{max}$, which expresses the convex inflection point marking value (i.e. the maximum value of the wheel velocity), and the value $Vw_{min}$, which expresses the concave inflection point marking value (i.e. the minimum value of the wheel velocity), which are found by the inflection point subroutine shown in FIG. 11 and described later.

Moreover, $\Delta T$ expresses the duration of time from the point in time when the concave inflection point is marked to the point in time when the convex inflection point is marked.

At the step S45, the recovery G arithmetic operation demand flag is cleared, and, at the step S46, the system judges whether or not the recovery G as calculated at the step S44 is less than the set value of the recovery G, i.e. $G_{gear}$. In case the recovery G calculated at the step S44 is less than the set value $G_{gear}$, the step S47 is executed, but, in case the value of the recovery G found at the step S44 is not any less than the set value $G_{gear}$, then the step S48 is executed.

At the step S47, it is judged that the power train is set ON, namely, that the power train between the rear wells RR and RL and the engine 15 is in its connected state, and the system sets the power train ON marking flag and then returns to the main routine. Moreover, at the step S48, the system judges that the power train is not ON, that is, the power train between the rear wheels RR and RL and the engine 15 is in the disconnected state, and the system clears the power train ON marking flag and returns to the main routine.

At the step S49, the system judges whether or not the concave inflection point marking flag is set. In case the concave inflection point marking flag is set, the step S51 is executed, but, on the contrary, in case the concave inflection point marking flag is not set, the step S50 is executed. In this regard, the concave inflection point marking flag is set up when it is judged by the inflection point marking subroutine, which is shown in FIG. 11 and described later, that the concave inflection point is attained, namely, that the wheel velocity is in the minimum value.

At the step S51, the counting of the $\Delta T$ is started and continued, and the recovery G arithmetic operation demand flag is set at the step S52. Then, the system returns to the main routine. Moreover, at the step S50, the value $\Delta T$ is cleared, and the system returns to the main routine. In this regard, the processing operations at the steps S42 through S52 as mentioned above correspond to some of the operations performed by the second arithmetic operation means according to the present invention.

Figure 11:
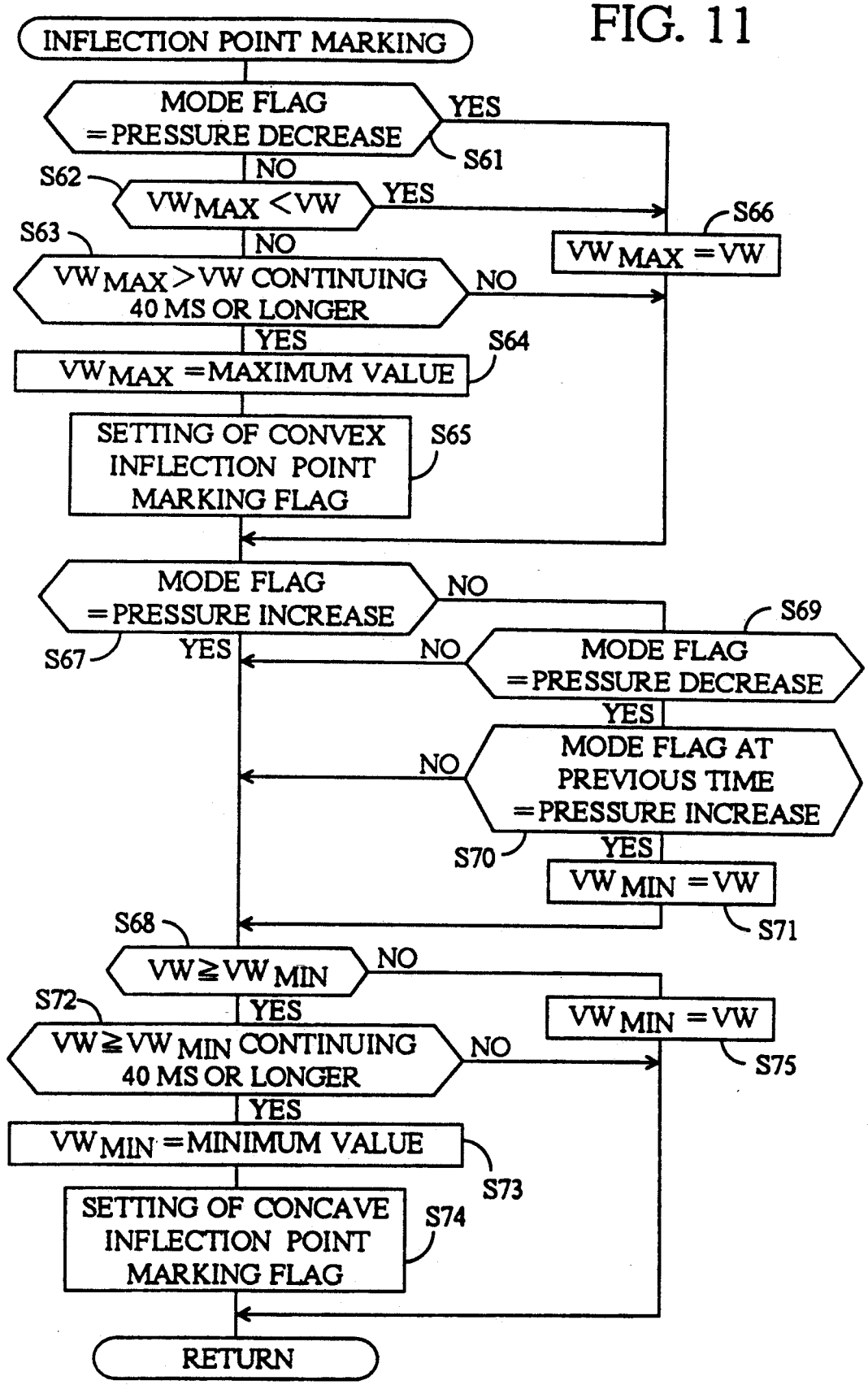

Next, a description is made of the inflection point marking subroutine, which is shown in FIG. 11.

At the step S61, it is judged whether or not the mode flag is set in the pressure decrease mode, and, in case "pressure decrease" is not set on the mode flag, the step S62 is executed, but, in case "pressure decrease" is set on the mode flag, the step S66 is executed. Moreover, the mode flag is set up in accordance with the process executed with the brake fluid pressure controlling subroutine, which is described later.

At the step S62, it is judged whether or not the maximum value $Vw_{max}$ of the wheel velocity is less than the wheel velocity Vw (i.e. the wheel velocity found at this time). If the said maximum value $Vw_{max}$ is less than the wheel velocity Vw, the step S66 is executed, but, if the said maximum value is not less than the wheel velocity, the step S63 is executed. At this juncture, the maximum value $Vw_{max}$ of the wheel velocity is set up at the point in time when it is judged at the step S61 that "pressure reduction" is not set on the mode flag, that is, when it is judged that the wheel velocity is in the process of its recovery.

At the step S63, it is judged whether or not the state in which the wheel velocity Vw at the current time is less than the maximum value $Vw_{max}$ has continued for any duration of time not less than 40 ms. In case it is judged that such a state has continued for or in excess of the said duration of time, then the step S64 is executed, but, in case it is found that such a state has not continued for the stated duration, the system executes the step S67 without executing the steps S64 and S65 described later.

At the step S64, it is judged that the $Vw_{max}$ which is set up at the previous time is in the maximum value, and the convex point marking flag is set at the step S65.

Moreover, at the step S66, the wheel velocity Vw recorded at this time is renewed as the value of $Vw_{max}$, and the system executes the step S67 without executing the steps S63 through S65.

At the step S67, it is judged whether or not "pressure increase" is set on the mode flag, and, when "pressure increase" is set on the mode flag, the step S68 is executed, but, in case "pressure increase" is not set on the mode flag, then the step S69 is executed.

At the step S69, it is judged whether or not "pressure decrease" is set on the mode flag, and, in case "pressure decrease" is not set on the mode flag, the step S68 is executed, but, in case "pressure decrease" is set on the mode flag, then the step S70 is executed.

At the step S70, it is judged whether or not "pressure increase" is set on the mode flag at the previous time, and, if "pressure increase" is not set on the mode flag at the previous time, the step S71 is executed. Then, after the wheel velocity Vw at this time is renewed as $Vw_{min}$ at the current time at the step S71, the step S68 is executed.

At the step S68, it is judged whether or not the minimum value $Vw_{min}$ of the wheel velocity is equal to or less than the wheel velocity Vw (which is the wheel velocity at this time), and, if the said minimum value of the wheel velocity is equal to or less than the wheel velocity, the step S72 is executed, but, if the said minimum value is not equal to or less than the wheel velocity, then the step S75 is executed. Moreover, the minimum value $Vw_{max}$ of the wheel velocity is set up at the point in time when it is judged at the step S67 that "pressure increase" is not set on the mode flag, which means that the wheel velocity is declining.

At the step S72, it is judged whether or not the state in which the minimum value $Vw_{min}$ of the wheel velocity is equal to or less than the wheel velocity Vw (i.e. the wheel velocity as recorded at this time) has continued for any duration of time not less than 40 ms, and, if the said state has been continued for the said duration of time, the step S73 is executed, but, if the said state is not continued for the said duration, then the system returns to the main routine without executing the steps S73 and S74, which are described later.

At the step S73, it is judged that the value $Vw_{min}$ which was set at the previous time is the minimum value, and the concave inflection point marking flag is set up at the step S74.

At the step S75, the wheel velocity Vw at this time is renewed as the value of $Vw_{min}$, and the system returns to the main routine without executing the steps S72 through S74. In this regard, the processing operations at the steps S61 through S75 described above correspond to some operations by the second arithmetic operation means according to the present invention.

Figure 12:
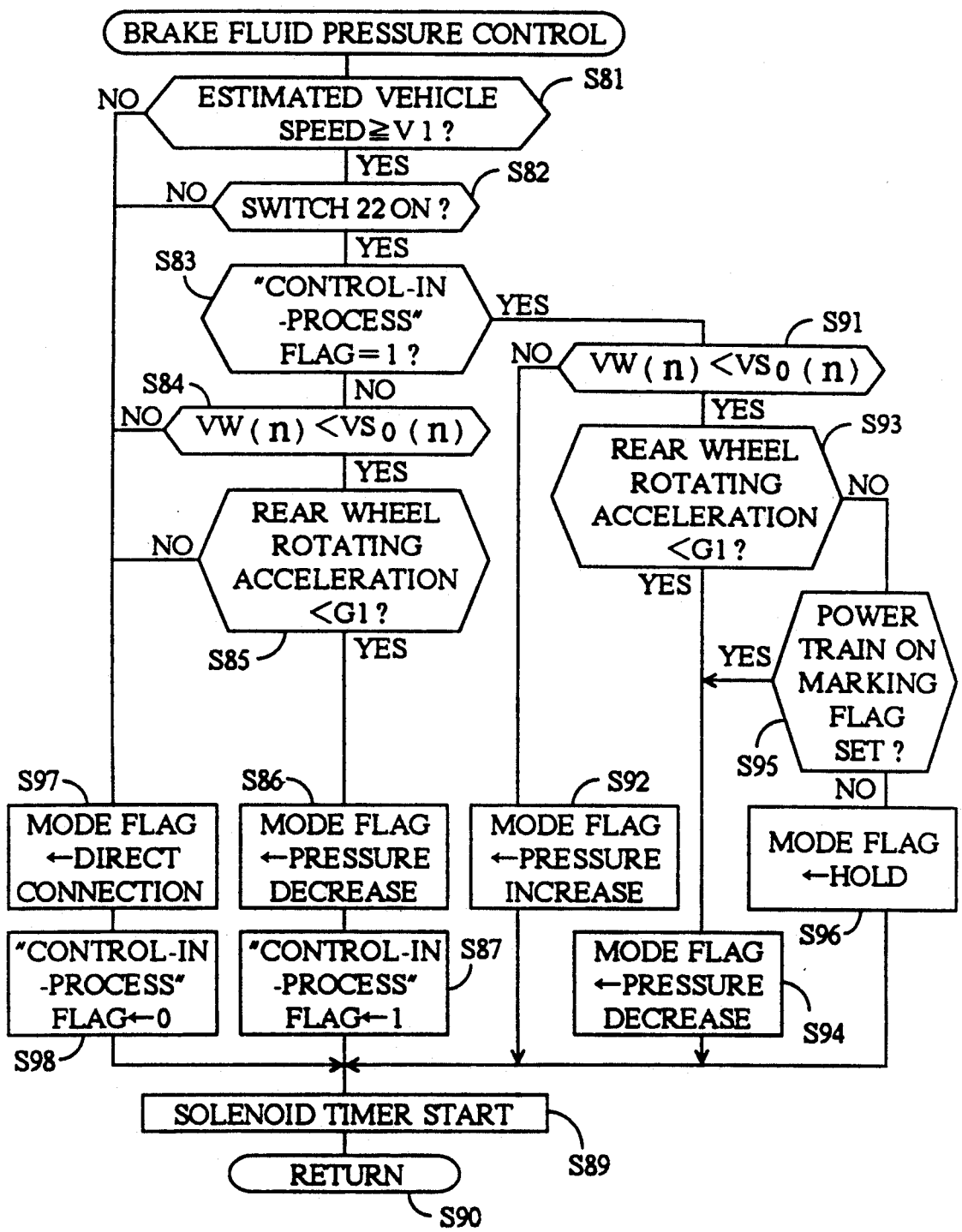

Next, a description is made of the brake fluid pressure control subroutine, which is shown in FIG. 12.

At the step S81, the estimated vehicle speed $Vso_{(n)}$ is compared with the first prescribed speed V1. The first prescribed speed V1 is the speed to be used for judging whether or not the motor vehicle is stopped. In the case of this example of preferred embodiment, the first prescribed speed is set at approximately 5 km/h. In case the estimated vehicle speed $Vso_{(n)}$ is not any lower than the first prescribed speed V1, the step S82 is executed. On the contrary, in case the estimated vehicle speed $Vso_{(n)}$ is less than the first prescribed speed V1, the step S97 is executed, and the brake fluid pressure control is not performed.

At the step S82, it is judged whether or not the brake indicating lamp switch 22 is ON. In case the brake indicating lamp switch 22 is ON, the step S83 is executed. On the contrary, in case the brake indicating lamp switch 22 is OFF, the step S97 is executed, and the brake fluid pressure control is not performed.

At the step S83, it is judged whether or not the "control-in-process" flag is set. In case the "control-in-process" flag is set, the step S91 is executed, but, on the contrary, in case the "control-in-process" flag is not set, the step S84 is executed. In this regard, the "control-in-process" flag is the flag which is set when the brake fluid pressure control is started, and the "control-in-process" flag continuously remains set while the brake fluid pressure control is being performed.

At the step S84, it is judged whether or not the wheel velocity $Vw_{(n)}$ of the rear wheels is less than the estimated vehicle speed $Vso_{(n)}$. In case the wheel velocity $Vw_{(n)}$ is less than the estimated vehicle speed $Vso_{(n)}$, it is judged that a slip has occurred to the rear wheels RR and RL. In such a case, the step S85 is executed. On the contrary, in case the wheel velocity $Vw_{(n)}$ is equal to or in excess of the estimated vehicle speed $Vso_{(n)}$ (that is, in the relationship, $Vw_{(n)} Vso_{(n)}$), it is judged that the rear wheels RR and RL are not slipping. In such a case, the step S97 is executed, and the brake fluid control is not performed.

At the step S85, it is judged whether or not the rotating acceleration $Gw_{(n)}$ of the rear wheels is less than the prescribed acceleration G1. In case the rotating acceleration $Gw_{(n)}$ of the rear wheels is less than the prescribed acceleration G1 (i.e. in the relationship, $Gw_{(n)} < G1$), it is judged that the rear wheels RR and RL are just about to lock. In such a case, the step S86 is executed, and the brake fluid pressure control is started. On the contrary, in case the rotating acceleration $Gw_{(n)}$ of the rear wheels is equal to or higher than the rotating acceleration G1 (i.e. $Gw_{(n)} G1$), it is judged that the rear wheels RR and RL will not lock immediately. In such a case, the brake fluid pressure control is not performed.

When the step S86 is executed, the electronic control unit (ECU) starts the brake fluid pressure control. At this step S86, the mode flag is set at "pressure decrease".

When the mode flag is thus set on "pressure decrease", the brake fluid pressure fed to the wheel cylinders 10 and 11 is reduced at the step S89, and the rear wheels RR and RL are thereby prevented from locking.

At the step S87, the "control-in-process" flag is set. The "control-in-process" flag remains set continuously until the estimated vehicle speed $Vso_{(n)}$ declines to a level below the first prescribed speed V1 (at the step S81) or until the brake indicating lamp switch 22 is turned OFF (at the step S82).

At the step S89, the solenoid timer is started. The solenoid timer is the timer which controls the duty factor of the electrical signals output from the output port OP1, and this timer is integrated in the microprocessor (MPU). In accordance with the value set for the mode flag, the solenoid timer controls the electric power supplied to the solenoid 36.

There are four types, namely, "pressure decrease", "pressure increase", "pressure hold", and "direct connection", in the values to be set for the mode flag. When "pressure decrease" is set on the mode flag, the actuator 12, which is operated under the control by the solenoid timer, reduces the pressure of the brake fluid applied to the wheel cylinders 10 and 11. Also, when "pressure increase" is set on the mode flag, the actuator 12, which is controlled by the solenoid timer, increases the pressure of the brake fluid applied to the wheel cylinders 10 and 11. Furthermore, when "pressure hold" is set on the mode flag, the actuator 12, which is controlled by the solenoid timer, maintains the brake fluid pressure applied to the wheel cylinders 10 and 11. Moreover, when "direct connection" is set on the mode flag, the actuator 12, which works under the control by the solenoid timer, forms a direct connection between the wheel cylinders 10 and 11 and the master cylinder 3.

At the step 90, the system performs the process operation for returning to the main routine.

In case the "control-in-process" flag is set at the step S83, the step S91 is executed. At the step S91, it is judged whether or not the wheel velocity $Vw_{(n)}$ of the rear wheels is less than the estimated vehicle speed $Vso_{(n)}$. As the process at the step S91 is the same as that at the step S84, its description is omitted here. In case the wheel velocity $Vw_{(n)}$ of the rear wheels is less than the estimated vehicle speed $Vso_{(n)}$, the step S93 is executed. On the contrary, in case the wheel velocity $Vw_{(n)}$ of the rear wheels is equal to or higher than the estimated vehicle speed $Vso_{(n)}$ (i.e. in the relation $Vw_{(n)}$ $Vso_{(n)}$), the step S92 is executed, and the mode flag is set at "pressure increase". In case the mode flag is thus set at "pressure increase", the brake fluid pressure applied to the wheel cylinders 10 and 11 is increased at the step S89.

At the step S93, it is judged whether or not the rotating acceleration $Gw_{(n)}$ of the rear wheels is less than the prescribed acceleration G1. Now that the process performed at the step S93 is the same as the process performed at the step S85, its description is omitted here. In case the rotating acceleration $Gw_{(n)}$ of the rear wheels is less than the prescribed acceleration G1, the step S94 is executed, and the mode flag is set at "pressure decrease". When "pressure decrease" is thus set on the mode flag, the brake fluid pressure applied to the wheel cylinders 10 and 11 is reduced at the step S89. On the contrary, in case the rotating acceleration $Gw_{(n)}$ of the rear wheels is equal to or in excess of the prescribed acceleration G1, the step S95 is executed.

At the step S95, it is judged whether or not the power train ON marking flag is set. In case the power train ON marking flag is set, the step S94 is performed and sets "pressure decrease" on the mode flag, and the brake fluid pressure applied to the wheel cylinders 10 and 11 is reduced at the step S89. In case the power train ON marking flag is not set, the step S96 is executed and sets "pressure hold" on the mode flag, and, at the step S89, the brake fluid pressure applied to the wheel cylinders 10 and 11 is maintained as it is.

By the repeated execution of the steps S91 through S96, the slip between the rear wheels RR and RL and the road surface is controlled to remain approximately constant, and stable braking force can be secured thereby.

When the estimated vehicle speed $Vs_{O(n)}$ decreases to a level below the first prescribed speed V1 at the step S81 or in case the brake indicating lamp switch 22 is turned OFF at the step 82, then the system executes the steps S97 and S98, finishing the brake fluid pressure control therewith. At the step S97, the mode flag is set at "direct connection". In case the mode flag is thus set at "direct connection", a direct connection is formed between the wheel cylinders 10 and 11 and the master cylinder 3 at the step 89. Also, at the step S98, the "control-in-process" flag is cleared.

Figure 13:
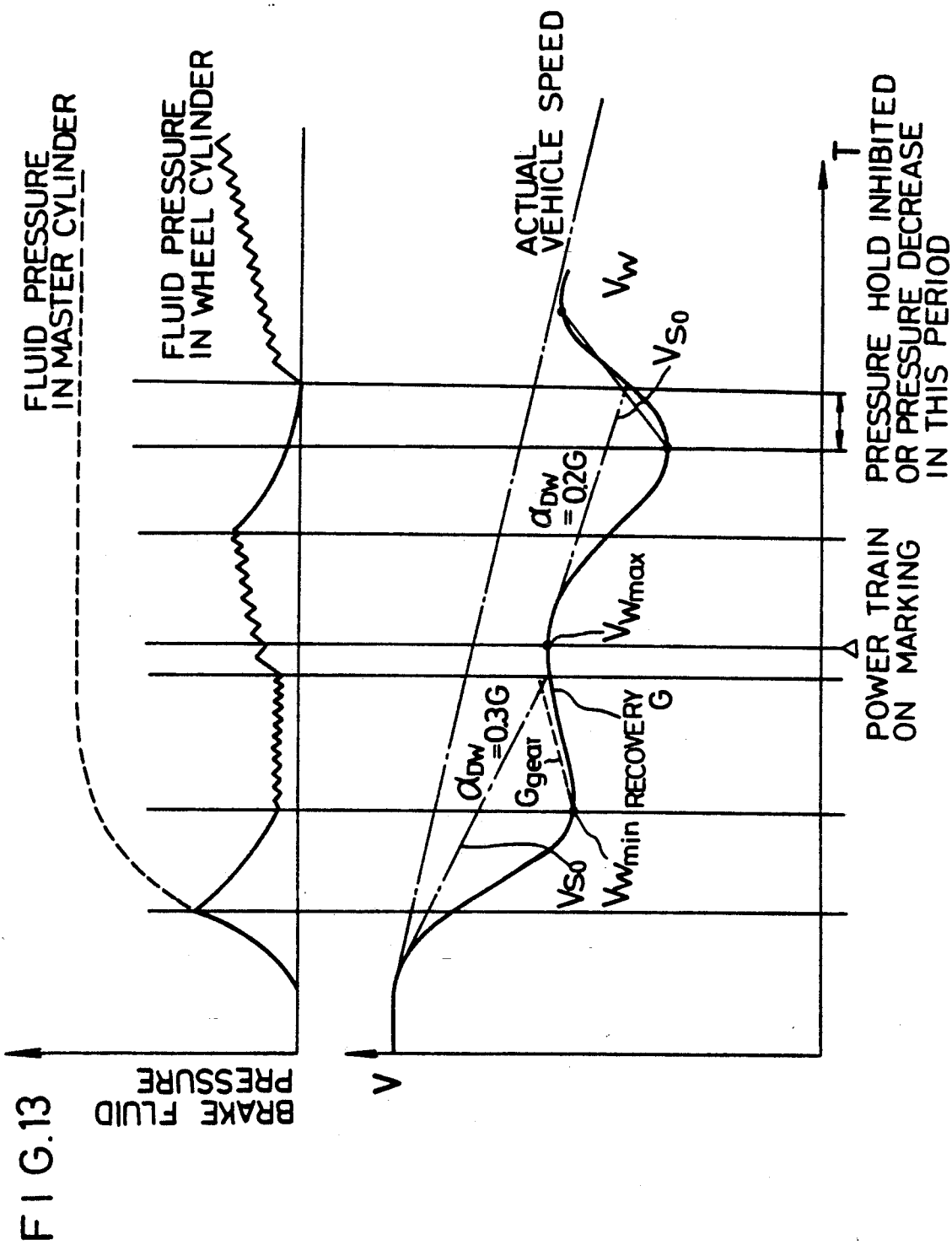
FIG. 13 is an illustrative chart for convenience in giving a description of the present invention.

With the estimated vehicle speed subroutine, the power train ON marking subroutine, and the inflection point marking subroutine, which are shown in FIG. 8, FIG. 10, and FIG. 11, respectively, the recovery G of the wheel velocity, which is detected at the time when the wheel velocity shifts from the concave inflection point (i.e. the minimum value $Vw_{min}$ of the wheel velocity) to the convex inflection point (i.e. the maximum value $Vw_{max}$ of the wheel velocity), is compared with the set value $G_{gear}$, and, in case it is found that the recovery G value is smaller than the set value $G_{gear}$, it is judged that the power train between the engine 15 and the rear wheels RR and RL is connected (i.e. in the state of power train connection ON). In which case the estimated acceleration $a_{DW}$ of the motor vehicle, which is set on the basis of the value output from the G sensor 21, is corrected to assume a smaller value. Therefore, as seen in FIG. 13, which shows the control waveform indicating the state of control at the time when the motor vehicle is running on a low-μ road surface acceleration, the estimated acceleration $a_{DW}$ of the motor vehicle is corrected so as to change from 0.3 G to 0.2 G (See FIG. 9) if the power train ON marking is set, and this correction results in promoting a sufficient recovery of the wheel velocity. Therefore, this system prevents the wheel velocity from falling considerably in relation to the actual vehicle speed as the control cycle increases and can prevent the occurrence of an early-stage lock of the wheels. Furthermore, with the inflection point marking subroutine shown in FIG. 11, the system identifies and marks the concave inflection point and the convex inflection point and finds the recovery G on the basis of the change in the wheel velocity between the two inflection points, so that the system is not liable to make a mistake in its calculation of the recovery G, unlike the case of a system which tends to make an error in finding the said value under the influence of the fluctuations which occur in the wheel velocity signals when the motor vehicle is running on a rough road surface. Hence, this system is not liable to make any error in its judgment in this respect. In other words, this system can prevent an extension of the braking distance, which results from a mistaken correction of the estimated acceleration $a_{DW}$ in favor of a smaller value in consequence of a wrong judgment that the power train is ON, even though the power train is in fact not connected, and can also prevent the occurrence of any early-stage lock of the wheels, which is caused by a considerable decline in the wheel velocity in relation to the actual speed of the motor vehicle in the absence of any correction of the estimated acceleration $a_{DW}$ of the motor vehicle because of a failure of the system in identifying a power train ON state despite the fact that the power train is actually ON.

Furthermore, with the brake fluid pressure control subroutine shown in FIG. 12, the system further continues the reduction of the brake fluid pressure applied to the wheel cylinders, in order to promote the further recovery of the wheel velocity, inhibiting the pressure holding operation for the brake fluid pressure in the wheel cylinders 10 and 11, in case the system has found that the rotating acceleration of the rear wheels RR and RL and has also marked the power train ON state as, illustrated in FIG. 13.

Thus, this system is capable of attaining improvements upon the running stability of the motor vehicle through its prevention of early-stage locks of the rear wheels by the effect of its further prevention of a considerable decline in the wheel velocity in relation to the actual vehicle speed as the control cycle increases.

Advantageous Effect of the Invention

As described hereinabove, the present invention offers an anti-skid control system wherein the second arithmetic operation means finds the maximum value and the minimum value in the wheel velocity of the driving wheels, calculate the recovery acceleration of the wheel velocity between the maximum value and the minimum value, and then, comparing the said recovery acceleration with the set value, judges that the power train between the driving wheels and the engine is connected, in case the recovery acceleration is less than the set value, and the vehicle acceleration correcting means corrects the acceleration of the vehicle as detected by the vehicle acceleration detecting means in such a manner as to set the said acceleration at a smaller value. Accordingly, the acceleration in the estimated vehicle speed, which is obtained by arithmetic operations from the wheel velocity of the driving wheels and the acceleration of the vehicle, is corrected to assume a smaller value, thereby promoting the recovery of the wheel velocity to a sufficient extent, which prevents the wheel velocity from declining considerably in relation to the actual vehicle speed and achieves the advantageous effect that the system improves the running stability of the motor wheel through prevention of early-stage locks of the rear wheels without incurring any increase of the manufacturing costs.

What is claimed is:

1. An anti-skid control system for a vehicle having driving wheels, said system comprising:

a brake fluid pressure source for generating high pressure and low pressure;

a switching valve means installed between said pressure source and wheel cylinders of the driving wheels driven by a power source via a speed change gear for selectively feeding either one of said high pressure and said low pressure to said wheel cylinders, a wheel velocity detecting means for detecting rotating speed of the driving wheels;

an acceleration detecting means for detecting acceleration of the vehicle;

a first arithmetic operation means for calculating an estimated vehicle speed and a rotating acceleration of the wheels by arithmetic operations on the basis of the rotating speed of the driving wheels detected by said wheel velocity detecting means and the acceleration of the vehicle detected by said acceleration detecting means;

a brake fluid pressure controlling means for increasing, decreasing or maintaining the brake fluid pressure in said wheel cylinders by controlling said switching valve means on the basis of said rotating speed of the driving wheels, said estimated vehicle speed and said rotating acceleration of the wheels:

a second arithmetic operation means for calculating a minimum value and a maximum value in said rotating speed of the driving wheels after a reduction of the pressure in the brake fluid on the basis of the rotating speed of the driving wheels detected by said wheel velocity detecting means, calculating a recovery acceleration in said rotating speed of the driving wheels in a shift from said minimum value to said maximum value, and comparing said recovery acceleration with a set value; and a vehicle acceleration correcting means for correcting the acceleration of the vehicle detected by said acceleration detecting means so as to set said acceleration of the vehicle at a smaller value in case said recovery acceleration is less than the set value.

2. An anti-skid control system as defined in claim 1, wherein the brake fluid pressure controlling means controls the switching valve means in such a manner that said switching valve means reduces the pressure of the brake fluid in the wheel cylinders when the rotating speed of the driving wheels declines to a level below the estimated vehicle speed and controls said switching valve means in such a manner that said switching valve means increases the pressure of the brake fluid in said wheel cylinders when said rotating speed of the driving wheels has exceeded said estimated vehicle speed.

3. An anti-skid control system as defined in claim 2, wherein the brake fluid pressure controlling means controls the switching valve means in such a manner that said switching valve means reduces the pressure of the brake fluid in the wheel cylinders when the rotating speed of the driving wheels is below the estimated vehicle speed while the rotating acceleration of the wheels is less than a prescribed value and controls said switching valve means in such a manner that said switching valve means maintains at the same level the pressure of the brake fluid in said wheel cylinders when said rotating speed of the driving wheels is less than said estimated vehicle speed while said rotating accelerating of said wheels is above the prescribed value, and wherein said brake fluid pressure controlling means further provides a reduction of the pressure in the brake fluid in said wheel cylinders, inhibiting the maintaining of said brake fluid pressure in said wheel cylinders by said switching valve means, when the second arithmetic operation means finds that said recovery acceleration is less than the set value while said rotating speed of the driving wheels is below said estimated vehicle speed and said rotating acceleration of said wheels is in excess of the prescribed value.

* * * * *